Dec. 5, 1961    P. W. SANFORD    3,011,517
CHECK VALVE
Filed Dec. 5, 1958
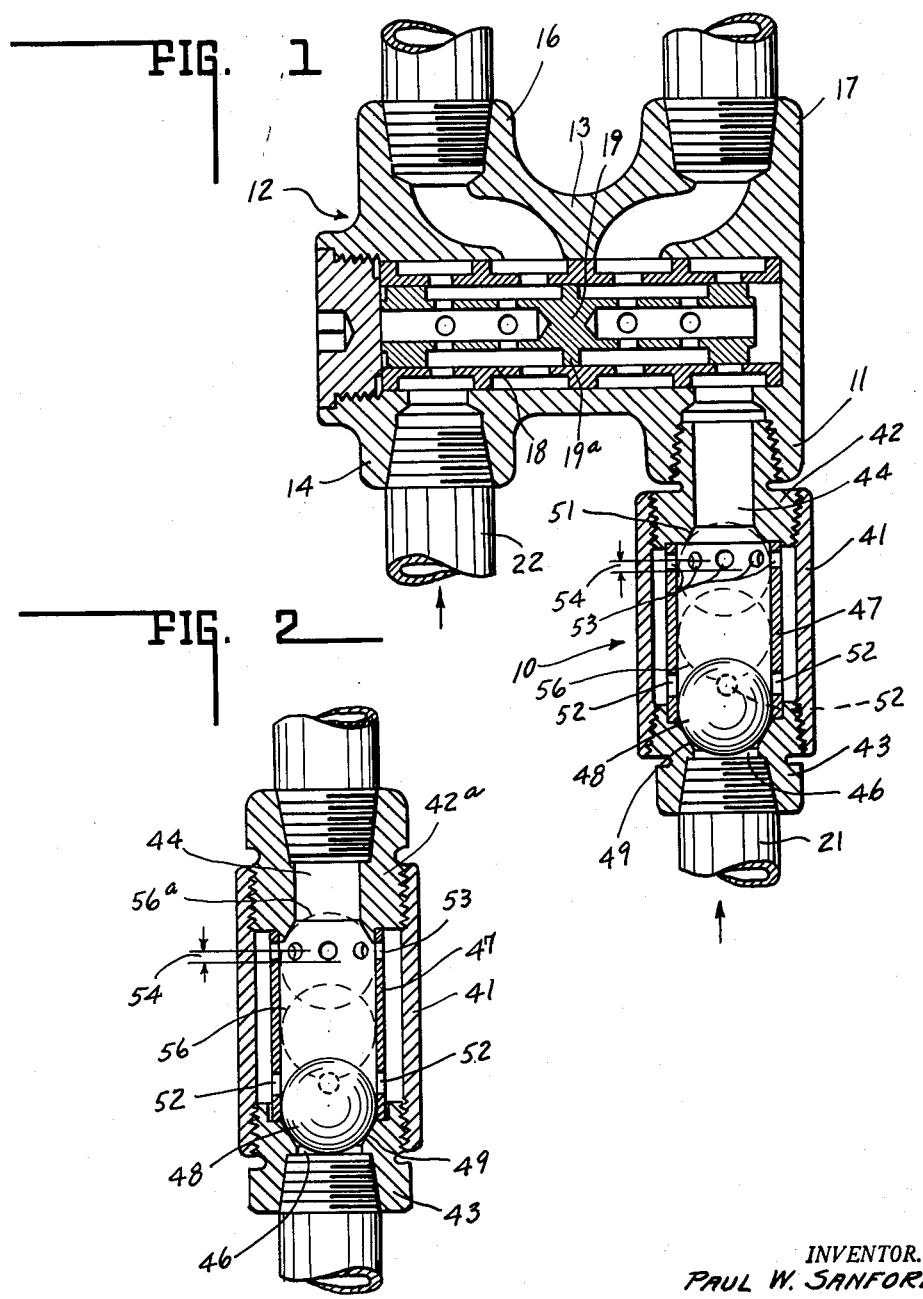
INVENTOR.
PAUL W. SANFORD.
BY
Lockwood, Woodard, Smith & Weikart.
ATTORNEYS.

United States Patent Office
3,011,517
Patented Dec. 5, 1961

3,011,517
CHECK VALVE
Paul W. Sanford, Indianapolis, Ind., assignor to Tempera Corporation, Portland, Oreg., a corporation of Oregon
Filed Dec. 5, 1958, Ser. No. 778,515
2 Claims. (Cl. 137—533.13)

This invention relates generally to valves permitting flow in one direction therethrough and in particular to valves of this type adapted to prevent the introduction of hot water or steam into cold water service lines.

In my copending application Serial No. 848,006, filed October 22, 1959, and titled "Pressure Compensating Valve" there is disclosed and claimed a valve assembly useful in proportioning hot and cold water flow in response to the pressure balance between the hot and cold water supply lines. The said valve assembly may be used to prevent overly hot water from being discharged at a shower head because of external, cold water draw-offs. The check valve of the present invention is essentially a safety device which may be used with the valve assembly of my said copending patent application as well as in other installations.

Whenever cold and hot water service lines are brought into proximity with the hot and cold water separated only by a piston or other proportioning member, such as in the valve assembly of my copending application or in various type of mixing valves, the danger exists that abnormally hot water or steam, caused by malfunctioning of the hot water heating equipment, may by-pass the piston or other proportioning member and enter the cold water service line. The result of such an occurrence is a highly dangerous condition in which scalding hot water may be discharged from cold water faucets or other service outlets.

The valve of the present invention is adapted to safeguard against the introduction of steam or abnormally hot water into the cold water service line when used with a proportioning valve as disclosed in my copending application or with various types of mixing valves. It will be understood that while the valve of the present invention is herein described as useful in preventing cross-connection of hot and cold water service lines, it could also be used wherever it is necessary to safeguard against contamination of one fluid line by another such as in various industrial processes.

A further object of the present invention is to provide a check valve which when installed is coaxial with the pipes into which it is connected, thereby requiring no elbows, offsets or the like, to complete its installation.

A further object of the present invention is to provide a valve of the type referred to which utilizes aligned outlet apertures whose centers are displaced downstream of the center of a ball closure to permit flow through the valve in one direction, the ball closure being movable against a seat axially spaced from the apertures to prevent flow through the valve in the opposite direction.

A further object of the present invention is to provide a check valve of the type herein referred to which is of simple construction and is relatively small in overall dimensions.

The full nature of the invention will be understood from the accompanying drawings and the following description and claims:

FIG. 1 is a side sectional view of a check valve embodying the present invention shown installed with the valve assembly of the forementioned copending application.

FIG. 2 is a side sectional view showing a slightly modified form of the check valve of the present invention.

Referring initially to FIG. 1, the check valve of the present invention is shown generally at 10. The check valve is installed in the cold water inlet fitting 11 of a proportioning valve indicated generally at 12. The proportioning valve per se forms no part of the present invention and is the valve assembly disclosed and claimed in my aforesaid copending application. The proportioning valve includes a valve body 13 provided with the cold water inlet fitting 11, a hot water inlet fitting 14, a hot water outlet fitting 16 and a cold water outlet fitting 17. The central body cavity is provided with a stationary sleeve 18 and a movable piston 19. As pointed out in my copending patent application, the piston 19 assumes a position which proportions the flow of hot water and cold water in response to the pressure balance between the cold and hot water supply lines 21 and 22, respectively. The hot water outlet fitting 16 and the cold water outlet fitting 17 are suitably connected to an apparatus, such as a shower head, not shown.

When the proportioning valve 12 is so installed, should a malfunctioning of the hot water heating means cause the presence of abnormally hot water in the supply pipe 22 or the generation of steam therein, the danger exists that this steam or abnormally hot water might leak past and the land 19a on the piston 19 and enter the cold water inlet fitting 11 and the cold water supply line.

The check valve of the present invention installed between the cold water supply line and the cold water inlet fitting 11, safeguards against this danger. The check valve includes an elongated tubular housing 41 which at one end receives a threaded female connecting member 42 in turn threaded into the inlet fitting 11 of the proportioning valve 12. The opposite end of the housing accommodates a reducer fitting 43 into which is threaded the cold water supply pipe 21. The fittings 42 and 43 define an outlet passage 44 and an inlet passage 46, respectively, at opposite ends of the housing.

A sleeve 47 is disposed within the housing and extends axially between the inlet passage 46 and the outlet passage 44, the side wall of the sleeve 47 being spaced from the housing side wall. A spherical closure member or ball 48 is disposed within the sleeve and is freely movable along the axis of the sleeve, and is sized to provide a piston action in its movement within the sleeve. At the end of the sleeve adjacent the inlet passage 46, the fitting 43 is formed so as to provide an inclined seat 49, the ball cooperating with the seat to prevent the flow of fluid.

At the opposite end of the sleeve, the fitting 42 is formed to provide an inclined seat or stop 51 which defines the extreme upward position of the ball as will subsequently be described. The interior of the sleeve communicates with the annular space between the sleeve and the housing side wall by means of spaced inlet apertures 52. At its upper end the sleeve is provided with a series of aligned outlet apertures 53. As indicated at 54, the plane defined by the centers of the apertures 53 is spaced downstream, or beyond the center of the ball 48 when the ball is against the stop 51.

In operation, upon the introduction of fluid under pressure into the check valve through the pipe 21, the ball will initially be moved toward its extreme position defined by the stop 51. Fluid will also flow through apertures 52 and rise in the space between sleeve 47 and housing 41 and will discharge in jets through the apertures 53. Since the outlet apertures 53 in the sleeve are spaced downstream of the center of the ball when in its extreme upward position, the kinetic energy of the jets issuing from apertures 53 into the sleeve will immediately drive the ball to a position intermediate the ends of the sleeve, this position being indicated at 56 in FIG. 1. The ball 48 will retain this mid-position during normal flow conditions. Cold water or similar fluid may then flow freely through the check valve and into the proportioning valve 12. Should withdrawals from the outlet side of the proportioning valve be terminated, causing the pressures on opposite sides of the ball to equalize, the ball will sink under the force of gravity into engagement with the seat 49.

Should the pressure in the outlet passage 42 increase above the pressure in the supply pipe 21 for any reason, such as because of the leakage of live steam across the proportioning valve, the ball 48 will be driven tightly against the seat 49 to prevent entry of the steam into the supply pipe 21. The closure of the inlet passage 46 under these conditions is positive in that the greater the pressure exerted on the ball, the tighter it will be seated.

Referring now to FIG. 2, there is shown a modified form of the check valve which is identical to that described with reference to FIG. 1 except that it accommodates a fitting 42a which replaces the fitting 42 of FIG. 1 and permits the check valve to be interposed in a run of pipe. In FIG. 2 parts that are identical with those of FIG. 1 are given the same reference numerals.

The operation of the modified form is identical to that of the form of FIG. 2, that is, when fluid under pressure is introduced into the inlet passage, the ball 48 initially moves towards its extreme upward position indicated at 56a and subsequently moves to its intermediate position indicated at 56. Should the pressure in the outlet passage increase beyond that in the inlet passage, the ball will be forced against its seat 49.

The fittings 42 and 43, the ball 48 and the sleeve 47 are preferably formed of stainless steel so as to have the maximum resistance to corrosion by fluids passing through the check valve. The series of inlet apertures 52 and the series of outlet apertures 53 are preferably sized so that the total area of each series of apertures is substantially equal to the cross sectional area of the inlet passage 46.

It should be noted that the check valve of the present invention has relatively small over-all dimensions and can be inserted in a run of pipe coaxially therewith. While the axis of movement of the ball is herein shown and described as being vertical, it will be evident that the valve could be inserted so that the axis of movement is inclined without adversely affecting the functioning of the valve.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A check valve adapted to permit unobstructed fluid flow in one direction and to seal against fluid flow in the opposite direction comprising an elongated, tubular housing, provided with an inlet passage and an outlet passage, said passages being coaxially disposed at opposite ends of said housing, a sleeve within said housing extending between said inlet and outlet passages with the side wall of the sleeve spaced from the side wall of said housing, a spherical closure member within said sleeve and freely movable with a piston action along the axis of said sleeve, a seat for said closure member carried by said housing and disposed at the end of said sleeve adjacent said inlet passage, stop means carried by said housing at the end of said sleeve adjacent said outlet passage and cooperating with said closure member to define one extreme position of said closure member along said sleeve axis, a series of inlet apertures in said sleeve providing communication between said inlet passage and the space between said sleeve and housing side walls only when said closure member is displaced from said seat, and a series of aligned outlet apertures in said sleeve disposed so that the plane defined by their centers is spaced downstream from the center of said closure member when said closure member is in said one extreme position, said series of inlet apertures and said series of outlet apertures in said sleeve each having a total area at least equal to the cross-sectional area of said inlet passage, whereby upon the introduction of fluid under pressure into said inlet passage said closure member is driven toward said one extreme position and is subsequently driven to a position intermediate the ends of said sleeve, and upon an increase in fluid pressure in said outlet passage above that of said inlet passage said closure member is driven into sealing engagement with said seat.

2. A check valve adapted to permit unobstructed fluid flow in one direction and to seal against fluid flow in the opposite direction comprising a housing provided with an inlet passage and an outlet passage, said passages being disposed at opposite ends of said housing, a sleeve within said housing extending between said inlet and outlet passages with the side wall of the sleeve spaced from the side wall of said housing, a spherical closure member within said sleeve and freely movable with a piston action along the axis of said sleeve, a seat for said closure member disposed at the end of said sleeve adjacent said inlet passage, stop means disposed at the end of said sleeve adjacent said outlet passage and cooperating with said closure member to define one extreme position of said closure member along said sleeve axis, at least one inlet aperture providing communication between said inlet passage and the space between said sleeve and housing side walls only when said closure member is displaced from said seat, and a series of aligned outlet apertures in said sleeve disposed so that the plane defined by their centers is spaced downstream from the center of said closure member when said closure member is in said one extreme position, said inlet aperture and said series of outlet apertures in said sleeve each having a total area at least equal to the cross-sectional area of said inlet passage, whereby upon the introduction of fluid under pressure into said inlet passage said closure member is driven toward said one extreme position and is subsequently driven to a position intermediate the ends of said sleeve, and upon an increase in fluid pressure in said outlet passage above that of said inlet passage said closure member is driven into sealing engagement with said seat.

References Cited in the file of this patent

UNITED STATES PATENTS

| 1,555,934 | Barker | Oct. 6, 1925 |
| 1,796,455 | Gunn | Mar. 17, 1931 |
| 2,501,755 | Bent | Mar. 28, 1950 |

FOREIGN PATENTS

| 512,480 | Germany | Nov. 12, 1930 |